July 31, 1956   J. M. PORTERFIELD, JR., ET AL   2,756,654
ORCHARD CULTIVATOR
Filed July 23, 1954   5 Sheets-Sheet 1
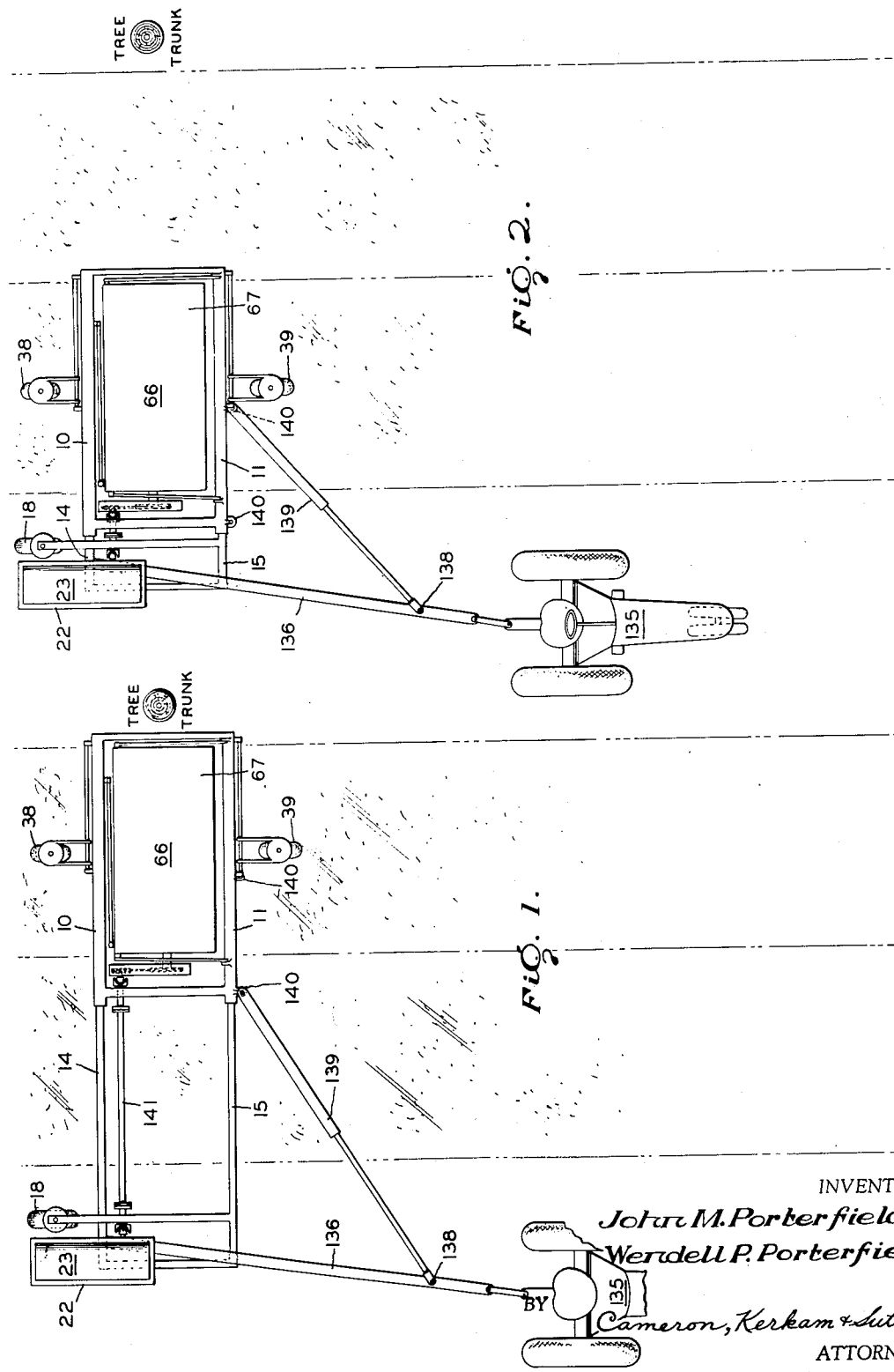
INVENTORS
John M. Porterfield, Jr.
Wendell P. Porterfield
BY
Cameron, Kerkam & Sutton
ATTORNEYS

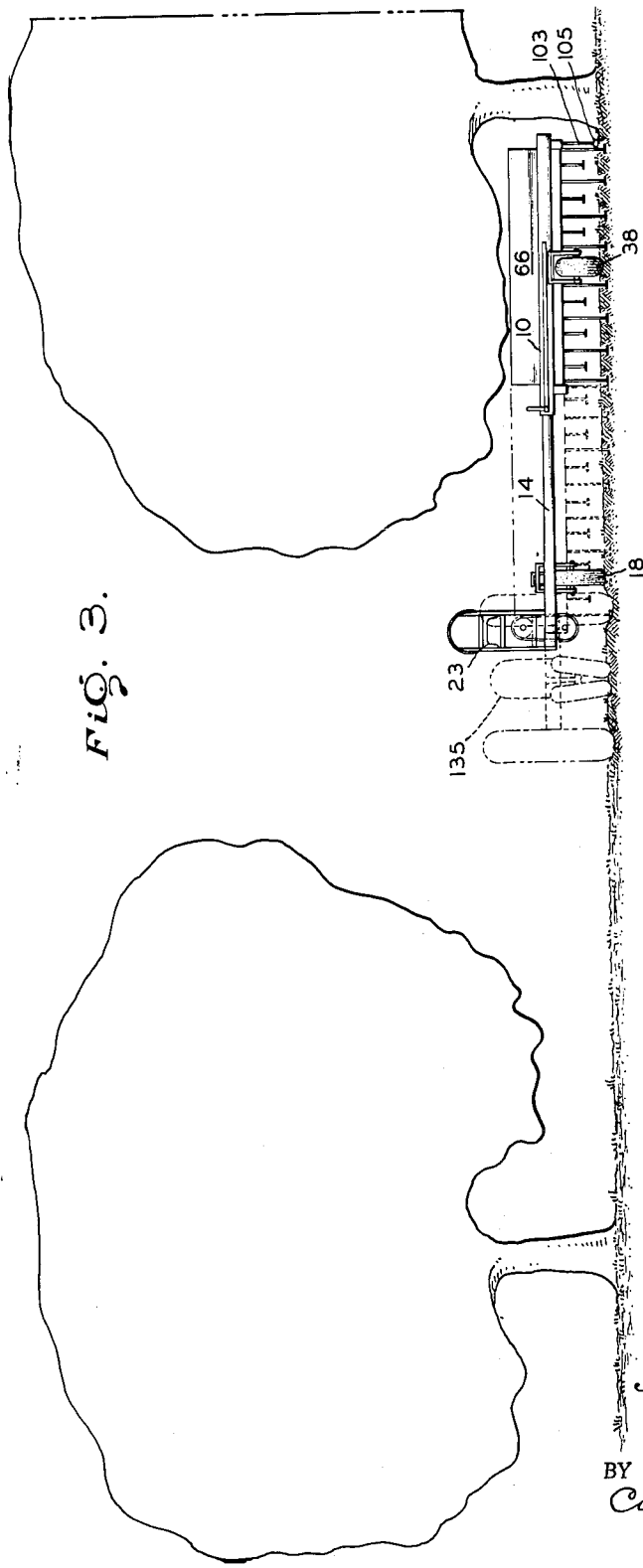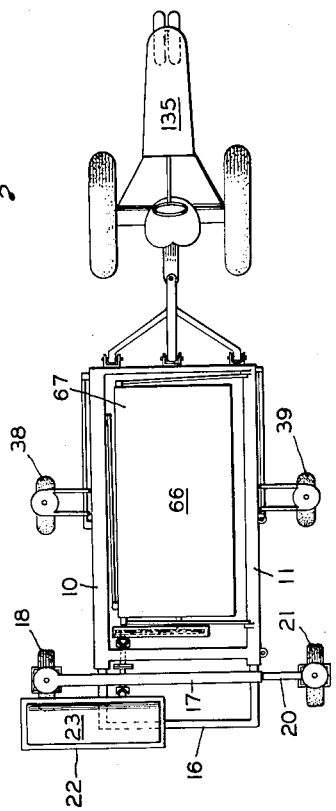

July 31, 1956  J. M. PORTERFIELD, JR., ET AL  2,756,654
ORCHARD CULTIVATOR

Filed July 23, 1954  5 Sheets-Sheet 3

INVENTORS
John M. Porterfield, Jr.
Wendell P. Porterfield
BY
Cameron, Kerkam & Sutton
ATTORNEYS

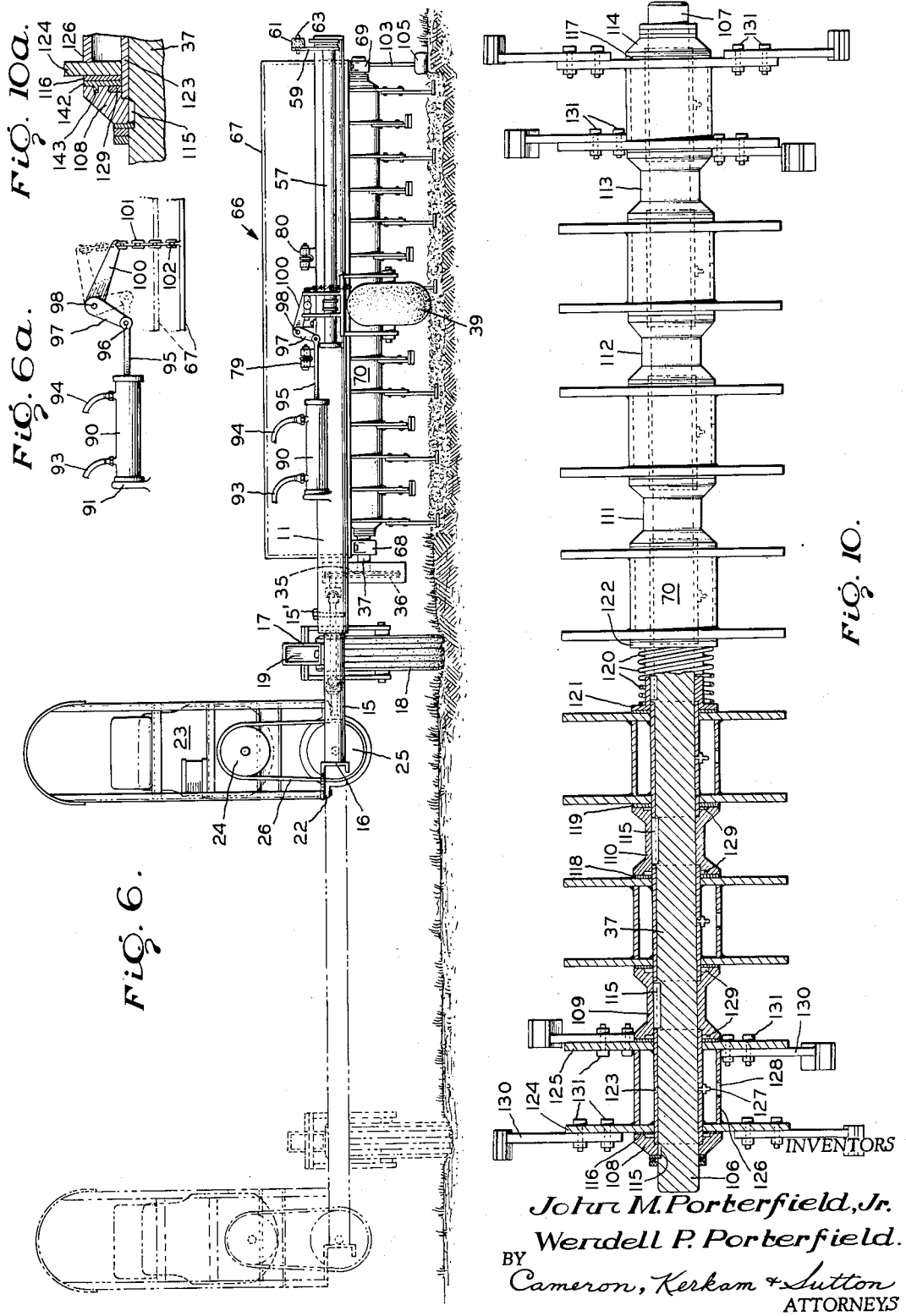

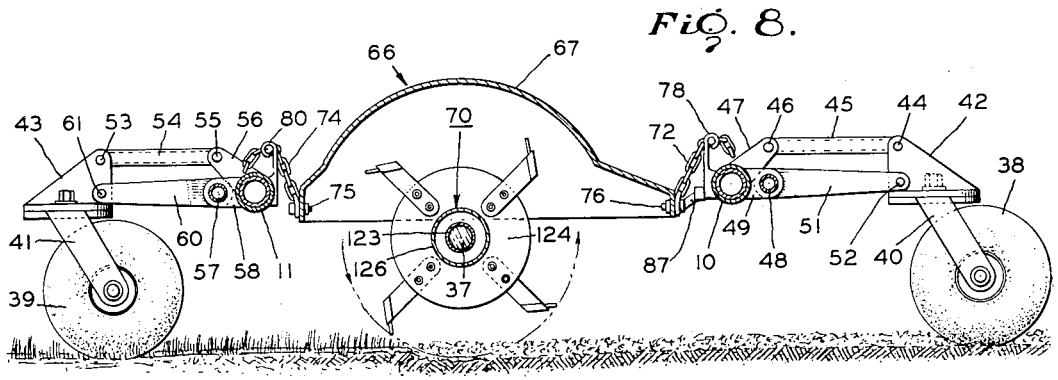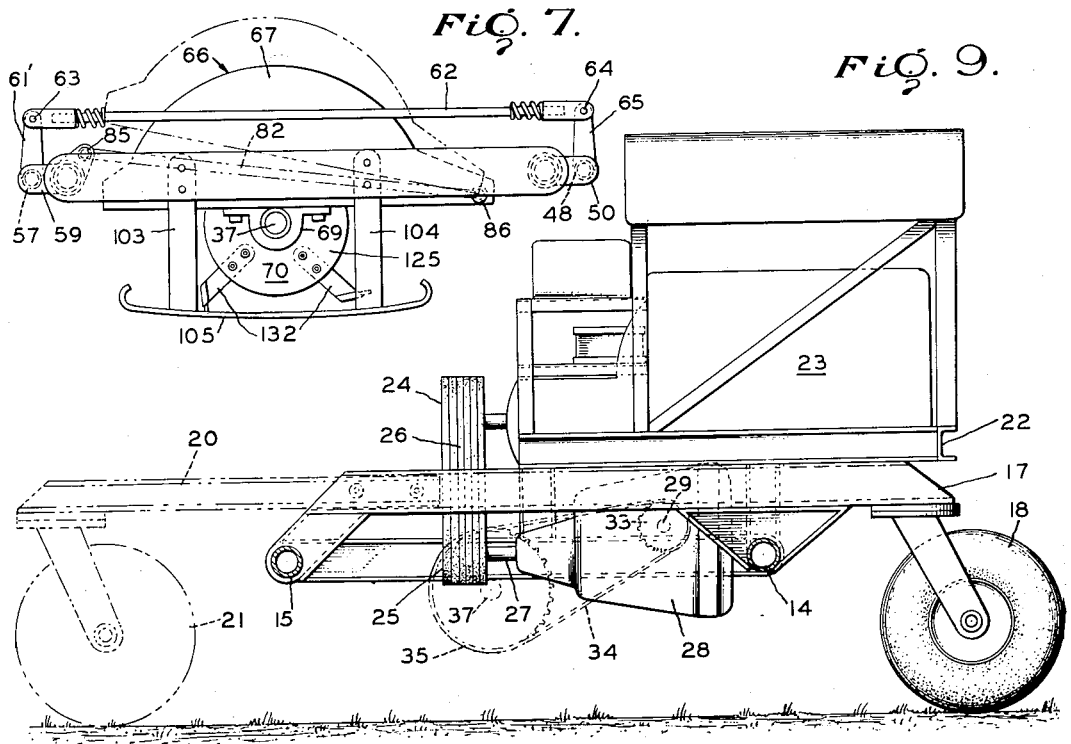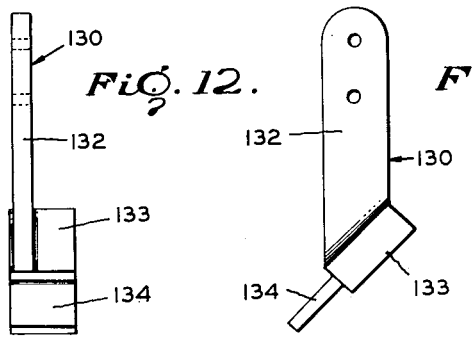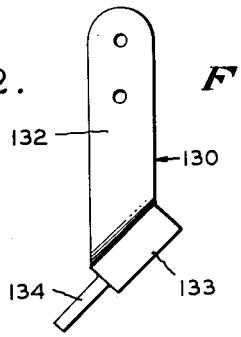

United States Patent Office 2,756,654
Patented July 31, 1956

2,756,654

ORCHARD CULTIVATOR

John M. Porterfield, Jr., and Wendell P. Porterfield, Martinsburg, W. Va.

Application July 23, 1954, Serial No. 445,231

15 Claims. (Cl. 97—40)

This invention relates to orchard cultivators and more particularly to orchard cultivators of the power driven rotary type in which the power supplied to the rotary cultivators is from a source separate and distinct from the powered mechanism for moving the cultivator.

In the cultivation of orchards it is necessary to cultivate beneath the overhanging boughs of the trees and close to the base of the trees both to keep down weeds and grass and to destroy the environment for field mice who destroy trees by girdling them. In older orchards with larger trees the extent of the overhang of the limbs is such that a cultivator which would be large enough to cultivate under the entire overhang of the limbs would be so cumbersome as to be impractical in use. In the cultivation of orchards it is most desirable to leave an uncultivated and solid roadway between the rows of trees to support the various vehicles used in working the orchards. An orchard cultivator must therefore be one which is compact enough to be easily handled, one which can cultivate the entire area beneath the trees without destroying the central roadway, and one which can be used for cross cultivation without destroying the central roadway.

Further, the depth of cut of an orchard cultivator must be closely controlled to a depth from 2 to 6 inches so that the roots of the trees will not be destroyed by cultivation. Most orchards are located in hilly, rough and frequently rocky terrain and an orchard cultivator to be practical must be rugged and strong, must maintain its controlled depth of cut regardless of rocks or other impediments which it may strike, and the individual cultivators or hoes must be so arranged that their motion will stop when an unyielding object is met.

Various orchard cultivators have been proposed in the prior art but most of them have proved unsatisfactory for failing to meet and satisfy one or more of the several conditions briefly described above. They have either been too large and unwieldly to be practical, control of depth of cultivation has not been obtained, it has been impossible to cross cultivate without destroying the roadways between the trees, or they have proved expensive to maintain in operation.

By the present invention we have provided a novel orchard cultivator which has met by exhaustive testing in our own orchards all of the requirements of a satisfactory orchard cultivator and one which, at the same time, provides advantages not heretofore obtained by prior art devices. In accordance with our invention a rotary type cultivator mounting a plurality of rotary hoes is mounted for floating movement in a wheeled frame which is provided with telescoping extensions. A suitable power source or motor is mounted upon this telescoping frame and the entire unit is drawn by a tractor or like device. The floating rotary cultivator is so arranged that it may be lifted out of engagement with the ground by suitable power mechanism for cross cultivation of orchards so that it may be lifted clear of the roadways between the trees and the rotary cultivator is also provided with mechanism for easily and readily adjusting the depth of cut of the hoes. A uniform depth of cut under all conditions is obtained by providing the wheels of the framework with a knee-action and by cross connecting the principal supporting wheels. By providing a telescoping framework for the cultivator it is possible to extend the framework to cultivate close to the trunks of the trees with the tractor remaining in the roadway between the trees and to telescope the framework for cultivation further away from the trunks of the trees with the tractor again moving in the roadway between the trees.

It is accordingly an object of the present invention to provide a novel orchard cultivator having a telescoping framework in which the cultivator unit is mounted having an adjustable reach of cultivation under trees in an orchard to provide close cultivation adjacent the trunks of the trees.

Another object is to provide such an orchard cultivator which when in telescoped position permits cultivation at a distance from the trunks of the trees.

Another object is to provide such a cultivator in which the depth of cultivation is closely controlled, as desired, in depths from 2 to 6 inches.

Another object is to provide such a cultivator in which cultivation of the trees is possible without destroying the roadway between the trees.

Another object is to provide such a cultivator in which cross cultivation of the orchard is possible without destroying the roadways between the trees.

Another object is to provide such a cultivator which will not only cultivate beneath the trees but which will also chop up and eliminate small brush beneath the trees resulting from pruning of the trees.

Another object is to provide such a cultivator in which uniform depth of cultivation is obtained by providing the principal supporting wheels of the telescoping framework with knee-action and by cross connecting an opposite pair of these wheels.

Another object is to provide such a cultivator in which the cultivating hoes are of a particular construction which we have found to be most suitable for this type of cultivation and in which they are readily renewed when worn.

Another object is to provide such a cultivator in which the rotor hubs supporting the cultivating hoes are of novel construction.

Another object is to provide such a cultivator in which the rotor hubs are provided with novel lubricaitng means.

Another object is to provide such a cultivator in which novel means are provided for absorbing shocks when the hoes strike immovable objects, such structure being found not only in the rotor hub construction but also in the drive mechanism for rotating the rotor hubs.

Another object is to provide such a cultivator in which the rotary cultivating unit is provided with a novel mounting in the telescoping frame and is provided with novel means for adjusting the depth of cultivation and for raising the hoes clear of the ground.

Other and further objects of the present invention will appear from the following description of an illustrative embodiment of the same.

The orchard cultivator of the present invention is capable of various mechanical embodiments, one of which is shown in the accompanying drawing, and is described hereinafter to illustrate the invention. This illustrative embodiment of the present invention should in no way be construed as defining or limiting the same and reference should be had to the appended claims to determine the scope of this invention.

In the accompanying drawings, in which like reference characters indicate similar parts, Fig. 1 is a somewhat schematic and pictorial view from above of an illustrative embodiment of the novel orchard cultivator of the present invention showing the framework thereof in opened position for close cultivation adjacent the trunks of the trees;

Fig. 2 is a view similar to that of Fig. 1 in which the framework of the cultivator is in telescoped position for cultivation at a distance from the trunks of the trees;

Fig. 3 is a front elevation of the embodiment of Fig. 1 showing the frame in opened position;

Fig. 4 is a view of the cultivator of Fig. 1 in telescoped position and arranged for transportation between cultivating jobs;

Fig. 6 is a front elevation in enlarged detail of the cultivator of Figs. 1 and 2 with the tractor unit removed for clarification;

Fig. 6a is an enlarged detail of a part of Fig. 6;

Fig. 7 is an end view of the cultivator as seen from the right in Fig. 6;

Fig. 8 is a cross sectional view on the line 8—8 of Fig. 5;

Fig. 9 is a sectional view of the cultivator on the line 9—9 in Fig. 5 showing in dotted lines the fourth wheel used when transporting the cultivator from one cultivating job to another;

Fig. 10 is a detailed showing, partly in section, of the novel rotor hub assembly utilized in the cultivator of the present invention;

Fig. 10a is an enlarged detail of a portion of Fig. 10 showing an arrangement for securing the sealing rings;

Fig. 11 is a side view of a hoe in accordance with the present invention showing the angularity of the blade with respect to the shank; and Fig. 12 is a front view of the hoe of Fig. 11.

Figure 5:
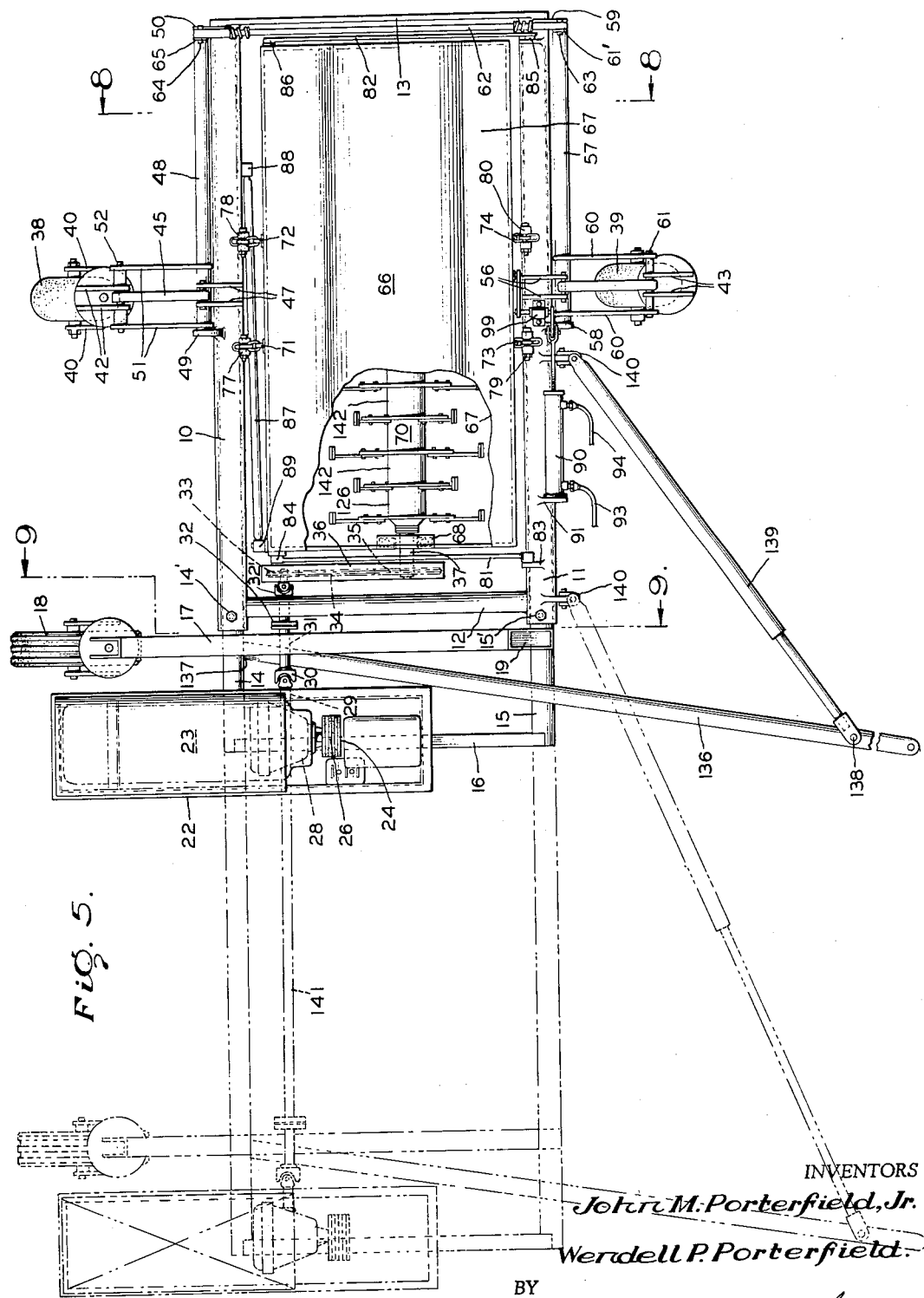
Fig. 5 is an enlarged view of the cultivator of Figs. 1 and 2 showing the several parts thereof with the framework in telescoped position and in opened position in dotted lines.

Referring now to the several figures, and more particularly to Figs. 5 and 6, it will there be seen that this embodiment of our novel orchard cultivator includes two longitudinal hollow tubular frame members 10 and 11 suitably spaced apart by lateral frame members 12 and 13 which are suitably secured thereto as by welding. Tubular extension frame members 14 and 15 are slidably mounted in members 10 and 11 and are spaced at their outer ends by frame member 16 secured thereto as by welding. Frame members 14 and 15 are held in any desired position with respect to frame members 10 and 11 by any suitable means, here shown as through bolts 14' and 15'. An additional cross frame member 17 is secured to the top of extension members 14 and 15 and supports a castering wheel 18 at one end and is open at 19 at its other end to receive a support 20 for wheel 21 (Fig. 9) for purposes which will appear more fully hereinafter. A suitable engine bed generally indicated at 22 is mounted on extension frame members 14 and 15 and on cross frame member 16 and an internal combustion engine, generally indicated at 23, is mounted on bed 22. Engine 23 drives a pulley 24 and pulley 24 drives a second pulley 25 through a plurality of V-belts 26 (Fig. 9). Pulley 25 is mounted upon shaft 27 which drives into gear box 28. Power from gear box 28 is transmitted through shaft 29, shaft 29 connecting through universal joint 30 to shaft 31. Shaft 31 is connected through coupling 32 and a second universal joint 32' with sprocket 33. Sprocket 33 drives through chain 34 to sprocket 35. A suitable cover 36 is provided for chain 34 and sprockets 33 and 35. Sprocket 35 is mounted upon shaft 37 to rotate the cultivator hoes as will more fully appear hereinafter.

In addition to the support provided by wheel 18 the rotary cultivator of the present invention is additionally supported by wheels 38 and 39 which are rotatably mounted in forks 40 and 41, respectively (Figure 8). Wheels 18, 38 and 39 are castering wheels but wheels 18 and 38 are locked to prevent castering during cultivation. Forks 40 and 41 terminate in upstanding webs 42 and 43, respectively. Web 42 is pivotally connected at 44 to link 45 which in turn is pivotally mounted between a pair of upstanding ears 47 which are secured on top of frame member 10. A rod 48 is rotatably mounted between brackets 49 and 50 secured to frame member 10 and rod 48 is rotated through links 51 which are secured thereto as by welding and are pivotally connected at 52 to web 42. Web 43 is pivotally connected at 53 to link 54 which in turn is pivotally mounted at 55 between a pair of upstanding ears 56 which are secured to frame member 11 as by welding. A rod 57 is rotatably mounted between brackets 58 and 59 secured to frame member 11 and rod 57 is rotated by links 60 which are pivoted at 61 to web 43 and are secured at their opposite ends to rod 57. Rod 57 carries an upstanding member 61' adjacent bracket 59 to which cross rod 62 is pivotally connected at 63. Cross rod 62 is pivotally connected at 64 to a similar upstanding member 65 secured to rod 48 (Fig. 7). Thus it will be seen that the action of wheels 38 and 39 are cross coupled so that the irregularities of the surface over which these wheels are passing will be compensated for and the uniform depth of cut of the cultivator will be maintained.

The power driven rotary cultivator unit generally indicated at 66 is mounted for limited vertical movement within the rectangular space provided between frame members 10, 11, 12 and 13. Unit 66 comprises a metal cover 67 having bearings 68 and 69 oppositely disposed at each end thereof to receive the rotary cultivator hub unit to be described more fully hereinafter and generally indicated at 70. Chains 71, 72, 73 and 74 are secured at their lower ends to cover 67 as at 75 and 76 (Fig. 8) and these chains are dropped into forks 77, 78, 79 and 80, respectively, forks 77 and 78 being mounted on frame member 10 and forks 79 and 80 being mounted on frame member 11. The depth of cut of the unit 70 may be readily adjusted by adjusting the length of the several chains 71—74 in their several holding forks 77—80, respectively. After adjustment for depth of cut the chains 71—74 may be prevented from jumping out of their respective forks 77—80 during the cultivating operation by securing them in their respective forks by known means, here shown as through bolts.

Excessive lateral or longitudinal movement of unit 66 within the framework is prevented by radius arms 81 and 82, radius arm 81 being universally connected at 83 to frame member 11 and at 84 to the adjacent far corner of cover 67. Radius arm 82 is universally connected to frame member 11 at 85 and is similarly connected to the adjacent far corner of cover 67 at 86. A third radius arm 87 is employed and is universally connected at 88 to frame member 10 and is similarly connected at 89 to the corner of cover 67 adjacent connection 84. Thus cover 67 and the rotary cultivator unit 70 can ride freely up and down within the framework of the cultivator unit and may tilt as required to compensate for irregularities of the surface of the ground without excessive lateral or longitudinal movement within the framework.

Unit 66 is raised out of cultivating engagement with the ground and is lowered into cultivating engagement with the ground by means of a mechanism shown in enlarged detail in Fig. 6a. This mechanism comprises a hydraulic cylinder 90 suitably secured to the front of frame member 11 at bracket 91 and is supplied with hydraulic fluid under pressure under control of the cultivator operator from a suitable source, not shown, through hoses 93 and 94. Cylinder 90 contains a piston, not shown, which drives a piston rod 95. Rod 95 is pivotally connected at 96 to a link member 97 which in turn rotates a shaft 98 which extends laterally across the top of frame member 11 and is supported in a suitable bearing 99. The other end of shaft 98 carries a lever 100 which carries chain 101 at its outer end which in turn is secured at its lower end to the bottom of cover 67 at 102. Thus when fluid under pressure is supplied to cylinder 90 through hose 93 piston rod 95 will move to the right and will rotate link member 97 and shaft 98 in a counterclockwise direction raising arm 100 and through chain 101 raising cover 67 and cultivator unit 70 from the ground. It is necessary of course that cultivator unit 70 be disengaged from the ground when the novel cultivator of the present invention is in transit between cultivating jobs and prompt and easy raising and lowering of the unit is essential in cross cultivating in the orchard to prevent destruction of the roadways between the trees.

The end of cover 67 adjacent frame member 13 is provided with a pair of downwardly extending support members 103 and 104 which support at their lowest extremities a suitable skid 105 which prevents the adjacent end of unit 66 from sagging and assists in the control of the depth of cultivation.

The rotary cultivator hoe assembly generally indicated at 70 is mounted upon shaft 37 which is provided with bearing surfaces 106 and 107 mounted in bearings 68 and 69. As described above, shaft 37 is rotated by sprocket 35. As best seen in Fig. 10, a plurality of clutch hubs 108, 109, 110, 111, 112, 113 and 114 are slidably mounted on shaft 37 and are keyed thereto through suitable keys 115 for rotation therewith. Hubs 108 and 114 are provided with single clutch surfaces 116 and 117, respectively, while hubs 109, 110, 111, 112 and 113 are each provided with oppositely disposed clutch surfaces 118 and 119. A cultivator hoe hub is mounted between clutch hub 108 and 109, a second is mounted between hub 109 and hub 110, a third hoe hub is mounted between clutch hub 110 and a suitable expansion spring 120 which bears against clutch plates 121 and 122, another hoe hub is mounted on shaft 37 between clutch plate 122 and clutch hub 111, another hoe hub is mounted between clutch hub 111 and clutch hub 112, another hoe hub is mounted between clutch hub 112 and clutch hub 113, and still another hoe hub is mounted between clutch hub 113 and clutch hub 114 the number of such units being determined by the width of cultivation desired. The hoe hubs are identical and each comprises a sleeve 123 mounted for rotation on shaft 37. A pair of discs 124 and 125 are centrally apertured and are suitably mounted on and secured to sleeve 123 as by welding, sleeve 123 extending beneath the adjacent clutch hubs. A second sleeve 126 surrounds sleeve 123 between plates 124 and 125 and is suitably secured to plates 124 and 125 as by welding. Lubrication is introduced to the surface between sleeve 123 and shaft 37 through the fitting 127 which is reached through aperture 128 in sleeve 126. Lubrication sealing rings are provided at 129 in each of the clutch hubs 108—114 and cooperate with the adjacent sleeve 123 to prevent the lubricant from spreading onto the clutch surfaces.

In the detail of Fig. 10a the sealing ring 129 is held in position by a disc 142 which is secured to hub 108 by suitable means such as pins 143. Use of discs 142 is preferred as providing an increased clutch surface.

A suitable number of cultivating hoes 130 are suitably secured as by nuts and bolts 131 to each of discs 124 and 125 and are shown as four in number in Fig. 8. Each hoe 130 includes a shank 132 terminating in a bracket 133 in which the hoe point 134 is secured. We have found that optimum cultivation is obtained by arranging the angularity of bracket 133 and point 134 with respect to the long axis of shank 132 so that a 45° angle is formed with the axial extension thereof.

Considering the rotary cultivator unit generally indicated at 70 it will be seen that each of the hoe hubs carrying the cultivating hoes is mounted for rotation on shaft 37 and is prevented from rotation thereon by the holding action of the friction surfaces of the adjacent clutch hubs. The amount of friction applied to the hoe hubs is determined by the strength of spring 120. Thus when any one of the hoes strikes an immovable object its hoe hub will rotate on shaft 37 against the friction of the contacting clutch surfaces until the obstacle is passed thus preventing damage to the hoes or to the rotary cultivator unit. It should be noted also in this connection that should several of the hoes strike an immovable object at the same time this shock is not only compensated for in the slippage provided between the friction surfaces but is also absorbed in the V-belt drive between the motor and the gear box 28. This arrangement has proved especially flexible and effective in use and has prevented excessive and undue wear of the parts of the cultivator.

As will be seen in Figs. 1–4, our novel orchard cultivator is moved or hauled by a tractor or other similar power unit generally indicated at 135 which is connected through its tow bar to a tow bar 136 which is removably secured to extension frame 14 at 137 (Fig. 5). Tow bar 136 is connected at 138 to an angle bar 139 which is connected at the desired bracket 140 to frame member 11. With this towing arrangement, and in view of the castering action of wheels 18, 38 and 39, the cultivator is easily and readily guided and directed during its cultivating action so that obstacles may be avoided and cultivation close to trees is obtained without damage to the trees.

When it is desired to cultivate between old and large trees with considerable overhang to the lower limbs the framework is extended to the position shown in Fig. 1 to increase the reach of the cultivator and an extension drive shaft 141 is connected between couplings 32. In this position the tractor 135 may maintain its course down the middle of the roadway between the trees and the cultivator unit 66 will extend underneath the limbs of the trees and into close cultivating adjacency to the trunks of the trees. After the ground adjacent the trunks of the trees has been cultivated the unit may be telescoped as in Fig. 2 and additional cultivation obtained between the bank of cultivation first obtained and the edge of the roadway while the tractor maintains its course down the middle of the roadway. The same procedure is employed when cross cultivating the orchard and at each roadway the cultivating unit 70 is raised by the action of the hydraulic cylinder 90 to prevent the roadway from being destroyed. Unit 70 is lowered after the roadway is passed for further cultivation.

When it is desired to move the cultivator from one job to another the cultivator frame is telescoped and wheel 21 is added by suitably securing support 20 in member 17. Tow bars 136 and 139 are then disconnected and the tractor tow bar is connected to the middle of an end of the unit. Wheels 18 and 21 are aligned with the frame and then locked against castering and the unit is readily towed from place to place.

Since grit raised by the action of the cultivator hoes would have a damaging effect on the friction surfaces of assembly 70 we provide dust and dirt covers to protect hubs 109, 110, spring 120, hub 111, hub 112 and hub 113 as shown at 142 in Fig. 5. These covers we have found have the additional and unexpected advantage of preventing wrapping of grass on the hubs when working cover crops.

It should now be apparent to those skilled in the art that by the present invention we have provided a novel orchard cultivator which in every way satisfies the several objectives described above as well as providing other and additional advantages not herein specifically mentioned and not heretofore obtained in known orchard cultivators.

Changes in or modifications to the illustrative embodiment of our invention described above may now be suggested without departing from the present inventive concept and reference should therefore be had to the appended claims to determine the scope of this invention.

What is claimed is:

1. In a cultivator, a frame, a rotary cultivator unit floatingly mounted in said frame, a pair of oppositely disposed castering wheels mounted medially of said frame, a telescoping extension for said frame, power means mounted on said extension, means for rotating said cultivator unit connecting said unit and said power means, a castering wheel supporting said frame extension adjacent said power means, and a draft bar connected to said extension frame adjacent said third wheel and a second draft bar connected to said first draft bar and to said frame.

2. In a cultivator a frame, a rotary cultivator unit mounted for limited vertical movement in said frame, a pair of oppositely disposed wheels supporting said frame, a telescoping extension for said frame, a motor mounted on said extension, drive means connecting said motor and said rotary cultivator unit, a wheel supporting said frame extension adjacent said motor, and draft means connected to said frame extension adjacent said motor.

3. A cultivator as described in claim 2 in which said pair of wheels are castering wheels mounted for vertical rotary movement with respect to said frame and means for connecting said wheels for equal vertical movement.

4. A cultivator as described in claim 2 including a tie rod at each end of said rotary cultivator unit connected at one end to said frame and connected at its other end to said unit and a third tie rod at right angles to said first named tie rods and connected at one end to said frame and at its other end to said unit.

5. A cultivator as described in claim 2 including adjustable means connected to said rotary cultivator unit and connected to said frame for controlling the depth of cultivation of said unit.

6. A cultivator as described in claim 2 having flexible means connected to said rotary cultivator unit and adjustably connected to said frame for controlling the depth of cultivation of said unit and power means for raising and lowering said unit with respect to said frame.

7. A cultivator as described in claim 2 having a cover in which said rotary cultivator unit is mounted, flexible means connected to said cover and adjustably connected to said frame for controlling the depth of cultivation and hydraulic powers means mounted on said frame and connected to said cover for raising and lowering said unit with respect to said frame.

8. A cultivator as described in claim 2 having a cover in which said rotary cultivator unit is mounted, a tie rod at each end of said cover connected at one end to said frame and at its other end to said cover and a third tie rod at right angles to said first named tie rods and connected at one end to said frame and at its other end to said cover.

9. A cultivator as described in claim 2 having a cover in which said rotary cultivator unit is mounted and a skid secured to the extremity of said cover away from said wheels.

10. A cultivator as described in claim 2 having a cover in which said rotary cultivator unit is rotatably mounted, tie rods between said frame and said cover permitting limited vertical movement of the cover, flexible means secured to said cover and adjustably secured to said frame for controlling the depth of cultivation, power means for raising and lowering said cover and rotary cultivator unit with respect to said frame, and a skid secured to said cover away from said wheels and engaging the ground when said cover is in lowered position.

11. In a cultivator as described in claim 2, a cover in which said rotary cultivator unit is rotatably mounted, aligned bearings mounted at opposite lower edges of said cover, said rotary cultivator unit including a shaft mounted in said bearings, clutch hubs mounted for rotation with and for axial movement on said shaft, cultivator hoe hubs mounted for rotation on said shaft and frictionally engaged by adjacent clutch hubs, resilient means urging said clutch hubs and said cultivator hoe hubs into frictional engagement, and a plurality of cultivator hoes removably and radially mounted on each of said cultivator hoe hubs.

12. A cultivator as described in claim 11 in which each of said cultivator hoe hubs includes a sleeve mounted for rotation on said shaft, means for introducing lubricant through said sleeve and to said shaft, a disk mounted on each end of said sleeve for frictional engagement with the adjacent clutch hub, a second sleeve spaced from and surrounding said first sleeve and secured at each end to the adjacent one of said disks, and means on each of said disks for securing said hoes thereto.

13. A cultivator as described in claim 12 in which each of said first named sleeves extends beyond said disks along said shaft and beneath the adjacent ends of said clutch hubs, and lubricant seals mounted in said clutch hubs and cooperating with said sleeves whereby loss of lubricant between said clutch hubs and said hoe hubs is prevented.

14. A cultivator as described in claim 12 in which each of said hoes includes a shank secured to extend radially from the adjacent disk and a hoe blade secured to the outer end of said shank at approximately a 45° angle to the extended radial line.

15. In a cultivator, a frame, a rotary cultivator unit mounted in said frame, a pair of oppositely disposed wheels supporting said frame, a telescoping extension for said frame, a motor mounted on said extension, a wheel supporting said frame extension near said motor and drive means connecting said motor and said rotary cultivator unit including a gear box mounted on said frame extension, belt drive means between said motor and said gear box, an extensible drive shaft from said gear box, a sprocket on the end of said shaft, a sprocket on the end of said rotary cultivator unit and a drive chain mounted on said sprockets.

References Cited in the file of this patent

UNITED STATES PATENTS

| | | |
|---|---|---|
| 1,637,098 | Barnes | July 26, 1927 |
| 1,827,121 | Christensen | Aug. 16, 1932 |
| 1,912,706 | Goodman | June 6, 1933 |
| 2,319,255 | Norton | May 18, 1943 |
| 2,357,761 | Peacock | Sept. 5, 1944 |
| 2,590,537 | Holmes | Mar. 25, 1952 |